(12) United States Patent
Aizawa et al.

(10) Patent No.: US 6,931,238 B1
(45) Date of Patent: Aug. 16, 2005

(54) RADIO COMMUNICATION APPARATUS AND ANTENNA CONTROL METHOD

(75) Inventors: Junichi Aizawa, Yokohama (JP); Osamu Kato, Yokosuka (JP); Mitsuru Uesugi, Yokosuka (JP); Takeshi Akiyama, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 499 days.

(21) Appl. No.: 09/830,993

(22) PCT Filed: Sep. 18, 2000

(86) PCT No.: PCT/JP00/06339

§ 371 (c)(1),
(2), (4) Date: May 3, 2001

(87) PCT Pub. No.: WO01/22621

PCT Pub. Date: Mar. 29, 2001

(30) Foreign Application Priority Data

Sep. 17, 1999 (JP) .................................. 11-263599
Nov. 30, 1999 (JP) .................................. 11-339411

(51) Int. Cl.[7] .............................. H03C 7/02; H04J 3/00

(52) U.S. Cl. ...................... 455/101; 455/375; 370/280; 370/347; 375/267

(58) Field of Search ........................... 455/13.2, 13.3, 455/13.1, 118, 103, 129, 500, 17, 561, 567.1, 455/101; 370/280, 347; 375/267

(56) References Cited

U.S. PATENT DOCUMENTS

| | | | | |
|---|---|---|---|---|
| 3,922,685 A | * | 11/1975 | Opas | 342/372 |
| 5,164,942 A | * | 11/1992 | Kamerman et al. | 370/334 |
| 6,006,075 A | * | 12/1999 | Smith et al. | 455/101 |
| 6,128,476 A | * | 10/2000 | Fujita | 455/101 |
| 6,317,411 B1 | * | 11/2001 | Whinnett et al. | 370/204 |

FOREIGN PATENT DOCUMENTS

| | | |
|---|---|---|
| EP | 0831627 | 3/1998 |
| GB | 2323750 | 9/1998 |
| JP | 548511 | 2/1933 |

(Continued)

OTHER PUBLICATIONS

Moriyama, E., Diversity Technology Based on Multiple Path and Antenna Selection for Wideband Communication System, May 1977, IEEE, vol. 3, 2007-2031.*

*Primary Examiner*—Nick Corsaro
*Assistant Examiner*—Angelica Perez
(74) *Attorney, Agent, or Firm*—Stevens, Davis, Miller & Mosher, LLP

(57) ABSTRACT

Radio section 103 multiplies modulated transmission signals A to D respectively by a carrier with a frequency of fA, fB, fC or fD, thereby performs the frequency conversion, and outputs the resultant signals to switch 104. Switch 104 switches between frequency conversion sections fA to fD and between antennas A to D to connect, and timing control section 105 outputs a timing control signal to switching control section 107 at time intervals for which timer 106 is preset. Switching control section 107 controls the switching of switch 104 according to switching patterns which are preset in switching pattern storage section 108 and which are each indicative of a connection relationship between antennas A to D and frequency conversion sections fA to fD.

6 Claims, 14 Drawing Sheets

FOREIGN PATENT DOCUMENTS

| | | |
|---|---|---|
| JP | 355938 | 3/1991 |
| JP | 690204 | 3/1994 |
| JP | 1051365 | 2/1998 |
| JP | 10112694 | 4/1998 |
| JP | 10209932 | 8/1998 |

* cited by examiner

SWITCHING PATTERN

| | ANTENNA A | ANTENNA B | ANTENNA C | ANTENNA D |
|---|---|---|---|---|
| PATTERN 1 | fA | fB | fC | fD |
| PATTERN 2 | fD | fA | fB | fC |
| PATTERN 3 | fC | fD | fA | fB |
| PATTERN 4 | fB | fC | fD | fA |

FIG. 3

SWITCHING PATTERN

| | ANTENNA A | ANTENNA B | ANTENNA C | ANTENNA D |
|---|---|---|---|---|
| PATTERN 1 | fA | fB | fC | fD |
| PATTERN 2 | fD | fC | fB | fA |

FIG. 6

SWITCHING PATTERN

| | S1 | S2 | S3 | S4 |
|---|---|---|---|---|
| PATTERN 1 | TRANSMISSION DATA A | TRANSMISSION DATA B | TRANSMISSION DATA C | TRANSMISSION DATA D |
| PATTERN 2 | TRANSMISSION DATA D | TRANSMISSION DATA A | TRANSMISSION DATA B | TRANSMISSION DATA C |
| PATTERN 3 | TRANSMISSION DATA C | TRANSMISSION DATA D | TRANSMISSION DATA A | TRANSMISSION DATA B |
| PATTERN 4 | TRANSMISSION DATA B | TRANSMISSION DATA C | TRANSMISSION DATA D | TRANSMISSION DATA A |

FIG. 9

SYNTHESIZER FREQUENCY SWITCHING TIMING

| | S1 | S2 | S3 | S4 |
|---|---|---|---|---|
| T1 | fA | fB | fC | fD |
| T2 | fD | fA | fB | fC |
| T3 | fC | fD | fA | fB |
| T4 | fB | fC | fD | fA |
| T5 | fA | fB | fC | fD |

SYNTHESIZER FREQUENCY SWITCHING TIMING

| | ANTENNA A | | ANTENNA B | | ANTENNA C | | ANTENNA D | |
|---|---|---|---|---|---|---|---|---|
| | S11 | S12 | S21 | S22 | S31 | S32 | S41 | S42 |
| T1 | fA | FREQUENCY SWITCHING | fB | FREQUENCY SWITCHING | fC | FREQUENCY SWITCHING | fD | FREQUENCY SWITCHING |
| T2 | FREQUENCY SWITCHING | fD | FREQUENCY SWITCHING | fA | FREQUENCY SWITCHING | fB | FREQUENCY SWITCHING | fC |
| T3 | fC | FREQUENCY SWITCHING | fD | FREQUENCY SWITCHING | fA | FREQUENCY SWITCHING | fB | FREQUENCY SWITCHING |
| T4 | FREQUENCY SWITCHING | fB | FREQUENCY SWITCHING | fC | FREQUENCY SWITCHING | fD | FREQUENCY SWITCHING | fA |
| T5 | fA | FREQUENCY SWITCHING | fB | FREQUENCY SWITCHING | fC | FREQUENCY SWITCHING | fD | FREQUENCY SWITCHING |

RADIO COMMUNICATION APPARATUS AND ANTENNA CONTROL METHOD

TECHNICAL FIELD

The present invention relates to a radio communication apparatus and antenna control method, and more particularly, to a radio communication apparatus provided with a plurality of antennas and a method for controlling the plurality of antennas.

BACKGROUND ART

In a one-to-N communication system where a base station transmits respective different information to a plurality of (N) mobile stations such as a radio communication service system, the base station is provided with a plurality of antennas, and concurrently transmits different information to a plurality of mobile stations with respective antennas.

In this case, a conventional base station apparatus transmits only one kind of information using one antenna. FIG. 1 is a diagram illustrating a situation where data is transmitted from a plurality of antennas provided in the conventional base station apparatus.

As illustrated in FIG. 1, the base station apparatus is provided with a plurality of antennas (herein, the number of antennas is assumed to be "4") The base station apparatus concurrently transmits transmission data A at a carrier frequency fA from an antenna A, transmission data B at a carrier frequency fB from an antenna B, transmission data C at a carrier frequency fC from an antenna C, and transmission data D at a carrier frequency fD from an antenna D.

However, there is a problem that the conventional base station apparatus does not provide the effect of the diversity in the case where the number of antennas of a mobile station on a receiving side is "1". That is, if the number of antennas of a mobile station is a plural number, the diversity effect can be obtained by the space diversity. However, the number of antennas of a mobile station is generally "1", and in this case, the diversity effect cannot be obtained. In particular, when the fading rate is low, an interval where a received level falls down lasts a long time, and therefore the diversity effect cannot be obtained.

DISCLOSURE OF INVENTION

It is an object of the present invention to provide a radio communication apparatus and antenna control method which are used in a one-to-N communication system where a transmitting-side apparatus provided with a plurality of antennas transmits respective different information to a plurality of (N) receiving-side apparatuses using the antennas, and which enable the excellent diversity effect even in the case where the number of antennas of the receiving-side apparatus is "1".

To achieve the above object, in the present invention, a plurality of kinds of transmission data are switched timewise sequentially between a plurality of antennas provided in the radio communication apparatus to be transmitted.

BRIEF DESCRIPTION OF DRAWINGS

FIG. 3 is a diagram illustrating an example of switching patterns preset in a switching pattern storage section in the radio communication apparatus according to the first embodiment of the present invention;

FIG. 6 is a diagram illustrating an example of switching patterns preset in a switching pattern storage section in a radio communication apparatus according to a third embodiment of the present invention;

FIG. 9 is a diagram illustrating an example of switching patterns preset in a switching pattern storage section in the radio communication apparatus according to the fourth embodiment of the present invention;

FIG. 10 is a diagram illustrating timings at which each synthesizer switches carrier frequencies in the radio communication apparatus according to the fourth embodiment of the present invention;

FIG. 13 is a diagram illustrating timings at which each synthesizer switches carrier frequencies in the radio communication apparatus according to the fifth embodiment of the present invention.

BEST MODE FOR CARRYING OUT THE INVENTION

Embodiments of the present invention will be explained below with reference to accompanying drawings.

First Embodiment

A radio communication apparatus and antenna control method according to this embodiment perform frequency conversion on a plurality of kinds of data with respective specific carrier frequencies, and timewise switch data sequentially between a plurality of antennas provided in the radio communication apparatus to transmit.

Figure 1:
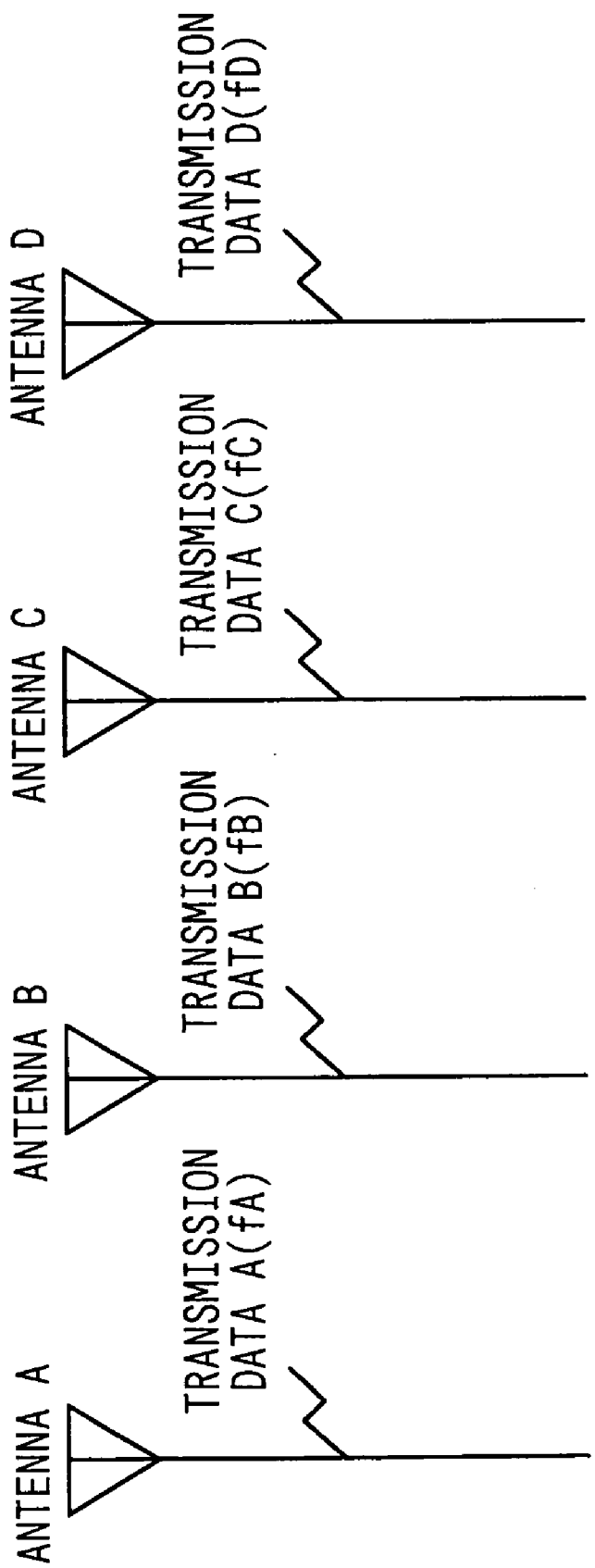
FIG. 1 is a diagram illustrating a situation where data is transmitted from a plurality of antennas provided in the conventional base station apparatus.
Figure 2:
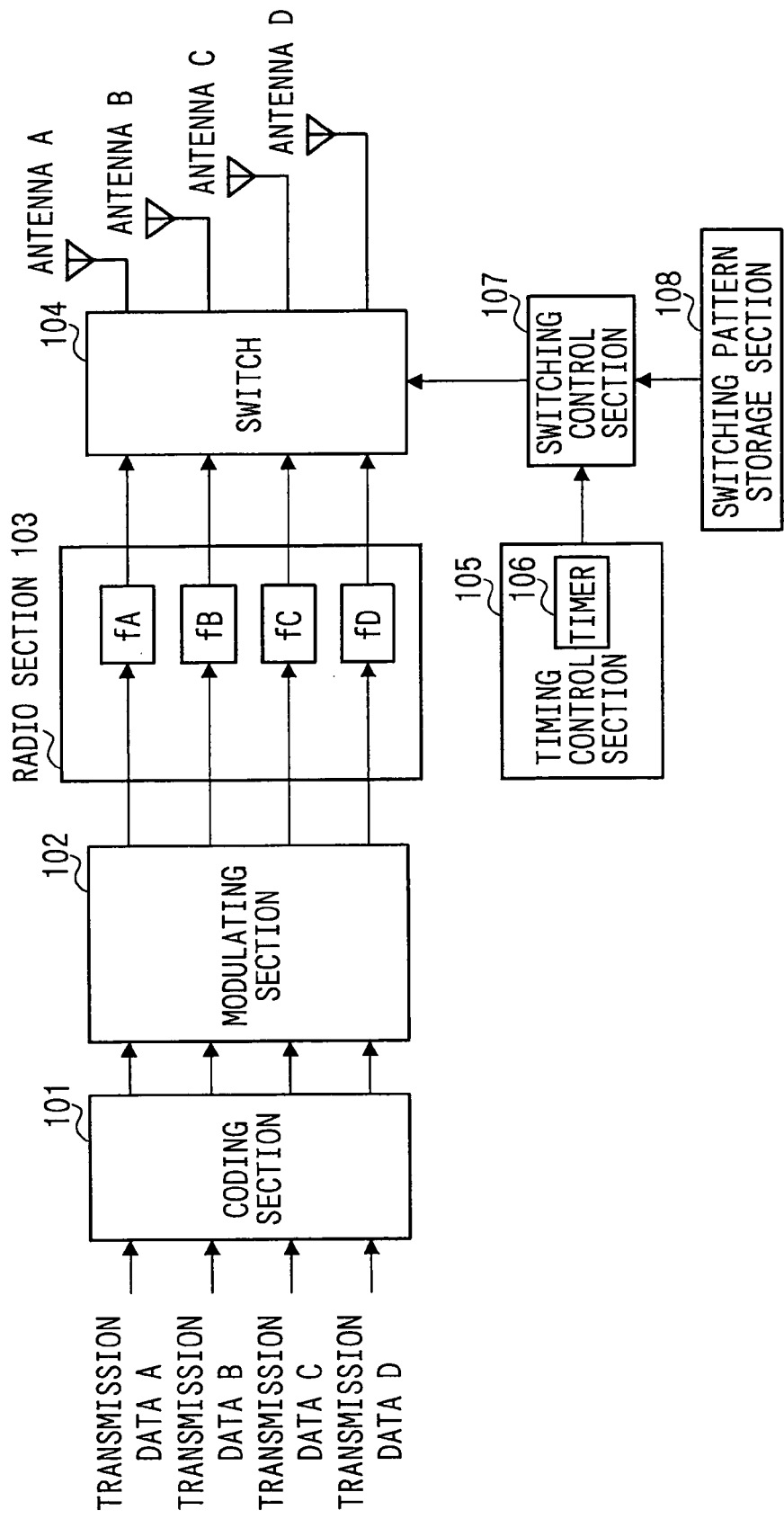
FIG. 2 is a general block diagram illustrating a schematic configuration of a radio communication apparatus according to a first embodiment of the present invention.

The radio communication apparatus and antenna control method according to the first embodiment of the present invention will be described below with reference to FIGS. 2 to 4. FIG. 2 is a general block diagram illustrating a schematic configuration of the radio communication apparatus according to the first embodiment of the present invention.

In the radio communication apparatus illustrated in FIG. 2, coding section 101 codes four kinds of transmission data A to D. Modulating section 102 performs predetermined modulation processing on the coded transmission data A to D. Radio section 103 multiplies the modulated transmission data A to D respectively by a carrier with a frequency of fA, fB, fC or fD, thereby performs the frequency conversion, and outputs the resultant signals to switch 104. Switch 104 switches between frequency conversion sections fA to fD in radio section 103 and between antennas A to D to connect.

The radio communication apparatus according to this embodiment is comprised of four frequency conversion sections fA to fD and four antennas A to D, so that the radio communication apparatus according to this embodiment transmits transmission data A to D respectively to four communication stations A to D (i.e., transmission data A to communication station A and the like). That is, in this embodiment, the radio communication apparatus is assumed to be used in a one-to-four communication system where one radio communication apparatus transmits respective different transmission data to four communication stations using four antennas.

Timing control section 105 outputs a timing control signal to switching control section 107 at time intervals for which timer 106 is preset. Switching control section 107 controls the switching of switch 104 according to switching patterns which are preset in switching pattern storage section 108 and which are each indicative of a connection relationship between antennas A to D and each of frequency conversion sections fA to fD.

The operation of the radio communication apparatus with the above configuration will be explained next. FIG. 3 is a diagram illustrating an example of the switching patterns preset in the switching pattern storage section in the radio communication apparatus according to the first embodiment of the present invention. FIG. 4 is a diagram illustrating a situation where data is transmitted from each antenna of the radio communication apparatus according to the first embodiment of the present invention.

The transmission data A to D subjected to the predetermined modulation processing in modulating section 102 are output to radio section 103. Then, the transmission data A to D are multiplied by the carrier of frequency fA, fB, fC or fD in frequency conversion sections fA to fD, respectively, thereby being subjected to the frequency conversion, and the signal with each of the frequencies fA to fD is output to switch 104.

Timer 106 is set for predetermined times, and according to the constant time intervals, timing control section 105 outputs the timing control signal to switching control section 107. Specifically, time 106 is preset for times T illustrated in FIG. 4. In other words, timing control section 105 outputs the timing control signal at times T1, T2, T3, T4, . . .

According to the timing control signal, switching control section 107 refers to switching pattern storage section 108, and controls the switching of switch 104. Specifically, the switching patterns as illustrated in FIG. 3 are preset in switching pattern storage section 108. Whenever the timing control signal is output, switching control section 107 refers to one of patterns 1 to 4 sequentially. That is, at time T1, switching control section 107 refers to the pattern 1 and according to this pattern, switches switch 104. Similarly, switching control section 107 refers to the pattern 2, pattern 3, and pattern 4 respectively at time T2, time T3 and time T4, and according to each pattern, switches switch 104. Further, at time T5, switching control section 107 refers to the pattern 1 again, and continues the similar processing as described above thereafter.

According to such a switching operation of switch 104, transmission data A to D respectively with the carrier frequencies fA to fD are switched to be sequentially transmitted from one of antennas A to D. Specifically, as illustrated in FIG. 4, at time T1, the transmission data A with the carrier frequency fA, the transmission data B with the carrier frequency fB, the transmission data C with the carrier frequency fC, and the transmission data D with the carrier frequency fD are transmitted at the same time respectively from antennas A, B, C and D.

Next, at time T2, the transmission data D with the carrier frequency fD, the transmission data A with the carrier frequency fA, the transmission data B with the carrier frequency fB, and the transmission data C with the carrier frequency fC are transmitted at the same time respectively from antennas A, B, C and D.

Figure 4:
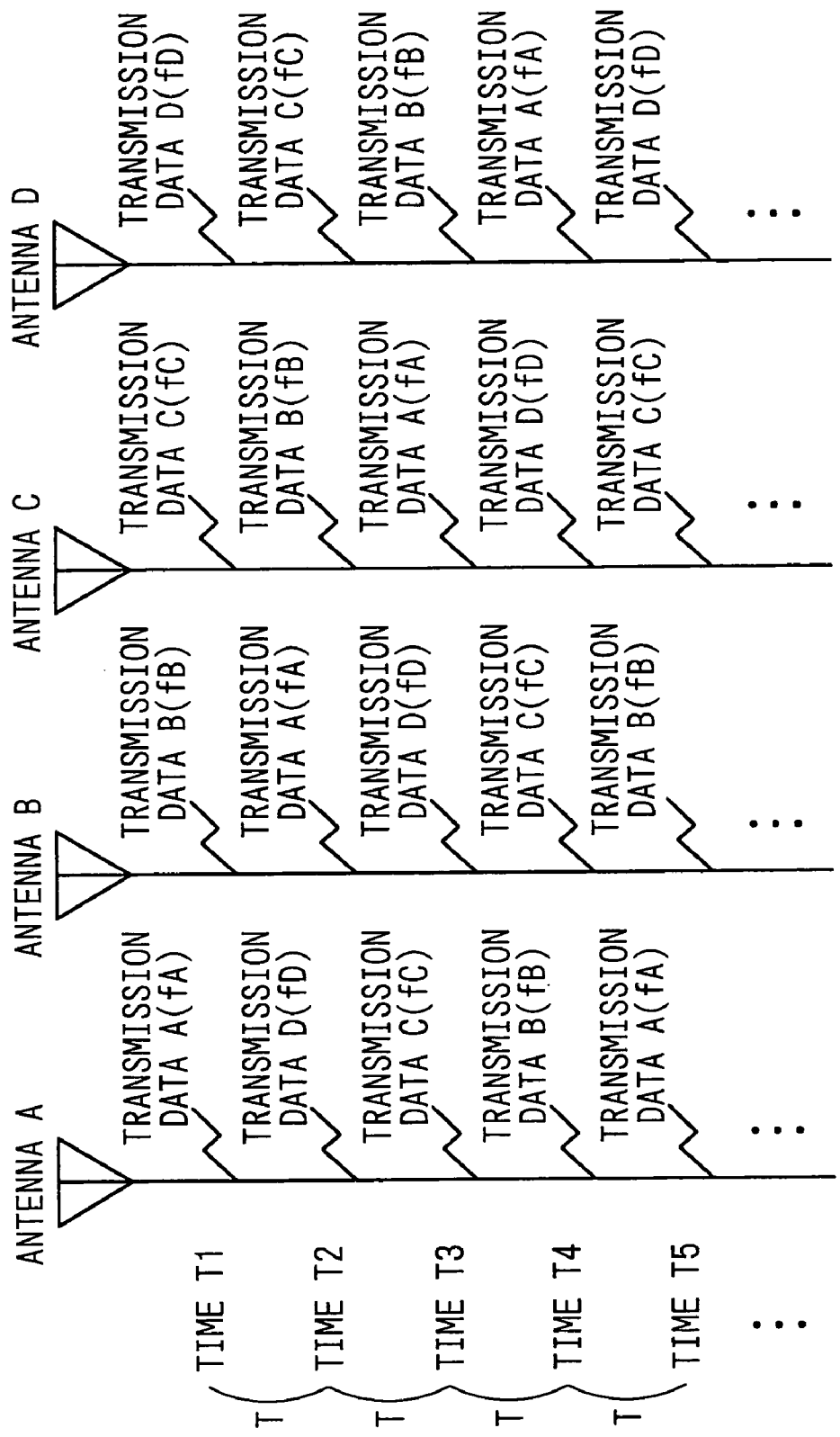
FIG. 4 is a diagram illustrating a situation where data is transmitted from each antenna of the radio communication apparatus according to the first embodiment of the present invention.

Thereafter in the similar way, as illustrated in FIG. 4, at each time Tn, transmission data A to D with the respective carrier frequencies fA to fD are switched sequentially between antennas A to D to be transmitted therefrom.

Thus, according to the radio communication apparatus and antenna control method according to this embodiment, a plurality of kinds of transmission data are subjected to the frequency conversion with the respective specific carrier frequencies, and are switched timewise sequentially to be transmitted between a plurality of antennas provided in the radio communication apparatus, whereby on a receiving side, if a received level of data falls down which is transmitted from some antenna, it is possible to receive the same kind of data transmitted from another antenna at the following time. Accordingly, the rate that the received level falls down is decreased, and therefore the receiving side is able to obtain the excellent diversity effect even in the case where the number of antennas on the receiving side is "1". Further, even when the fading rate is low, since it is possible to receive at the following time the same kind of data transmitted from another antenna, it is possible to obtain the diversity effect.

Second Embodiment

A radio communication apparatus and antenna control method according to this embodiment are different from those of the first embodiment in a point that a switching pattern repeating period is made equal to a time interleaving length of FEC (Forward Error Correction).

Figure 5:
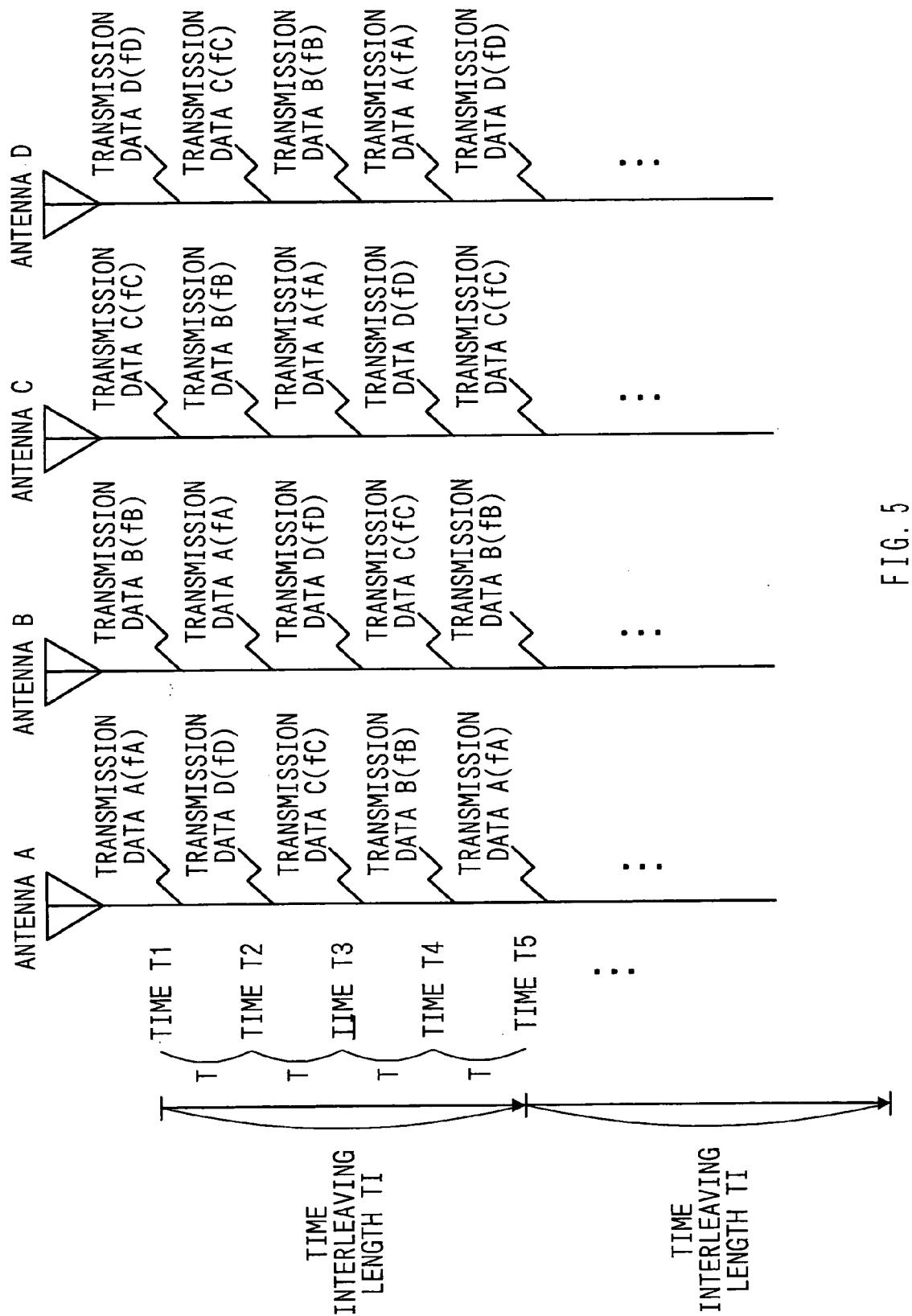
FIG. 5 is a diagram illustrating a situation where data is transmitted from each antenna of a radio communication apparatus according to a second embodiment of the present invention.

The radio communication apparatus and antenna control method according to the second embodiment of the present invention will be explained below with reference to FIG. 5. FIG. 5 is a diagram illustrating a situation where data is transmitted from each antenna of the radio communication apparatus according to the second embodiment of the present invention.

The "time interleaving length of FEC" is herein indicative of a period of time at which data subjected to convolutional coding is divided to be transmitted.

In switching pattern storage section 108, switching patterns are set such that the number of divided items of data subjected to convolutional coding is equal to the number of switching patterns. Specifically, for example, assuming the number of divided items is "4", as illustrated in FIG. 3, four patterns, i.e., patterns 1 to 4, are set as switching patterns.

Further, timer 106 is preset for a time T so that the switching pattern repeating period is equal to the time interleaving length TI of FEC. In other words, when there are four kinds of transmission data A to D, the time T is set at one-fourth the time interleaving length.

Accordingly, as illustrated in FIG. 5, the switching pattern at time T1 is the same as the switching pattern at time T5 when the time interleaving length TI has elapsed after time T1. Thereafter, using the time interleaving length TI as the switching pattern repeating period, the switching of switch 104 is controlled.

Thus, according to the radio communication apparatus and antenna control method according to this embodiment, a plurality of kinds of transmission data are subjected to the frequency conversion with the respective specific carrier frequencies, and are switched timewise sequentially to be transmitted between a plurality of antennas provided in the radio communication apparatus, and the switching pattern repeating period is made equal to the time interleaving length of FEC, whereby the error randomizing due to the effect of transmitting data using a plurality of antennas is added to the error randomizing due to the interleaving effect. As a result, it is possible to obtain the excellent diversity effect even when the number of receiving-side antennas is "1", and to improve the error correcting capability as compared to the first embodiment.

Third Embodiment

A radio communication apparatus and antenna control method according to this embodiment are different from those of the first embodiment in a point that switching patterns are set so as to switch transmission data between antennas having low antenna correlation with each other.

Figure 7:
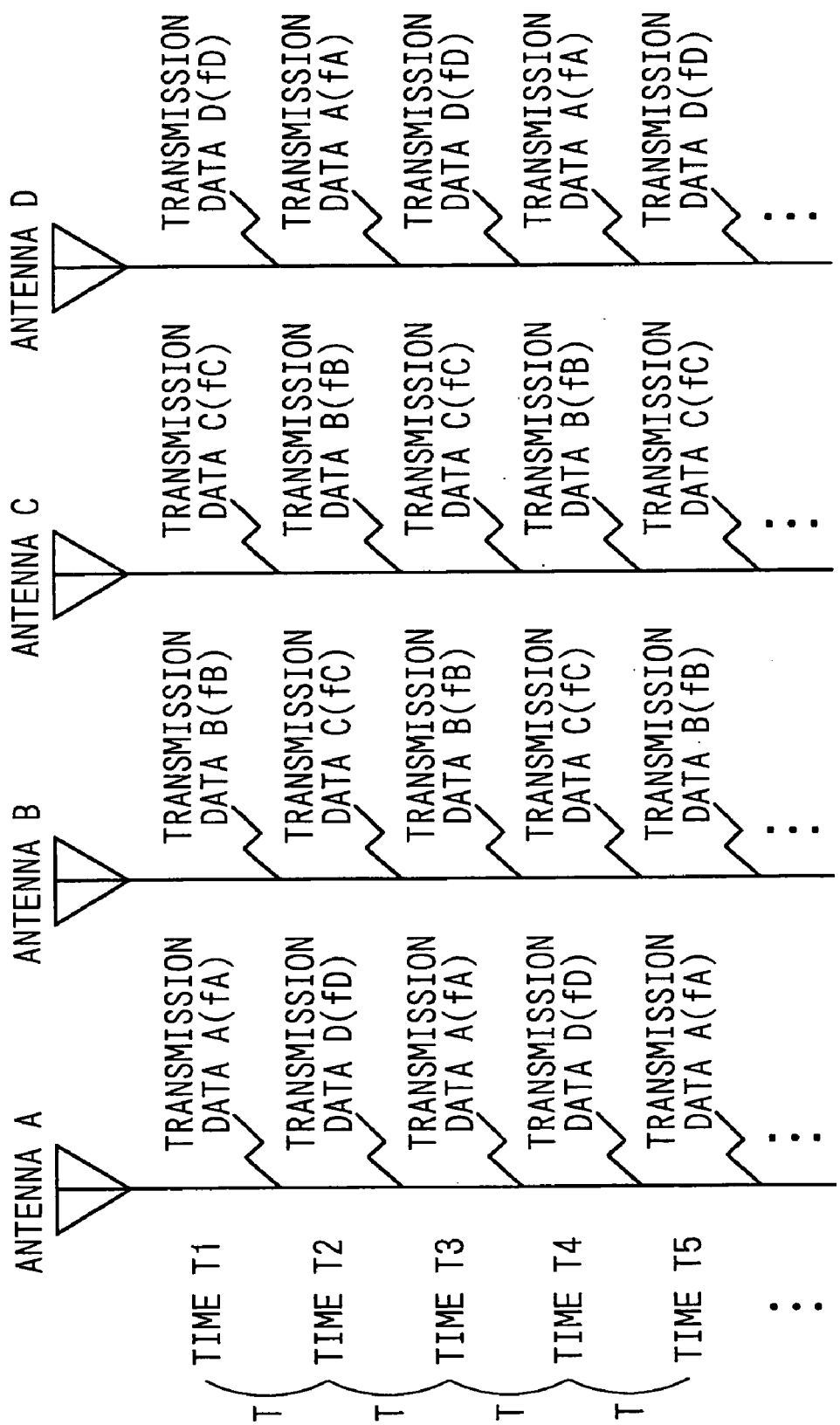
FIG. 7 is a diagram illustrating a situation where data is transmitted from each antenna of the radio communication apparatus according to the third embodiment of the present invention.

The radio communication apparatus and antenna control method according to the third embodiment of the present invention will be explained below with reference to FIGS. 6 and 7. FIG. 6 is a diagram illustrating an example of switching patterns preset in a switching pattern storage section in the radio communication apparatus according to the third embodiment of the present invention. FIG. 7 is a diagram illustrating a situation where data is transmitted from each antenna of the radio communication apparatus according to the third embodiment of the present invention.

The "antenna correlation" is herein indicative of cross-correlation between antennas. In the first embodiment, the switching is performed without considering the degree of the antenna correlation, and therefore it may happen that even when the transmission data is transmitted while switching the antennas, the fading similar to that before the switching occurs.

When the antenna correlation is low, the data items transmitted from different antennas are considered on the receiving side to be transmitted through different propagation paths. Accordingly, if a received level falls down of data transmitted from some antenna, it is considered that another received level does not fall down of the same kind of data transmitted from another antenna having the low antenna correlation.

Hence, in this embodiment, switching pattern storage section 108 is set for switching patterns such that transmission data is switched between antennas having the low antenna correlation with each other.

Specifically, in FIG. 7, for example, assuming that antennas A and D have the low antenna correlation, and that antennas B and C have the low antenna correlation, the switching patterns become as illustrated in FIG. 6. In other words, the switching patterns are set so that transmission data A and D are switched between the antennas A and D having the low antenna correlation, and that transmission data B and C are switched between the antennas B and C having the low antenna correlation.

Accordingly, as illustrated in FIG. 7, switching control section 107 controls at time T1 the switching of switch 104 according to the pattern 1 illustrated in FIG. 6, and at time T2, controls the switching of switch 104 according to the pattern 2 illustrated in FIG. 6. Then, at time T3, switching control section 107 controls the switching of switch 104 again according to the pattern 1 illustrated in FIG. 6. The similar operation is repeated thereafter.

As a result of thus performing the switching control, as illustrated in FIG. 7, at time T1, transmission data A with the carrier frequency fA, transmission data B with the carrier frequency fB, transmission data C with the carrier frequency fC, and transmission data D with the carrier frequency fD are transmitted at the same time respectively from antennas A, B, C and D.

Next, at time T2, transmission data D with the carrier frequency fD, transmission data C with the carrier frequency fC, transmission data B with the carrier frequency fB, and transmission data A with the carrier frequency fA are transmitted at the same time respectively from antennas A, B, C and D.

Thereafter in the similar way, as illustrated in FIG. 7, at each time Tn, the data is switched between the antennas having the low antenna correlation with each other, in other words, transmission data A and D are switched between the antennas A and D having the low antenna correlation, while transmission B and C are switched between the antennas B and C having the low antenna correlation.

Thus, according to the radio communication apparatus and antenna control method according to this embodiment, a plurality of kinds of transmission data are subjected to the frequency conversion with the respective specific carrier frequencies, and are switched timewise sequentially to be transmitted between a plurality of antennas provided in the radio communication apparatus, and the switching patterns are set so that transmission data is switched between antennas having the low antenna correlation with each other. Therefore, as compared to the first embodiment, it is possible to increase the reliability for obtaining the diversity effect and to improve the error correcting capability.

Fourth Embodiment

A radio communication apparatus and antenna control method according to this embodiment are different from those of the first embodiment in a point that a plurality of kinds of transmission data in digital baseband state is assigned to each antenna sequentially before being converted to a signal with the carrier frequency of a high frequency.

Figure 8:
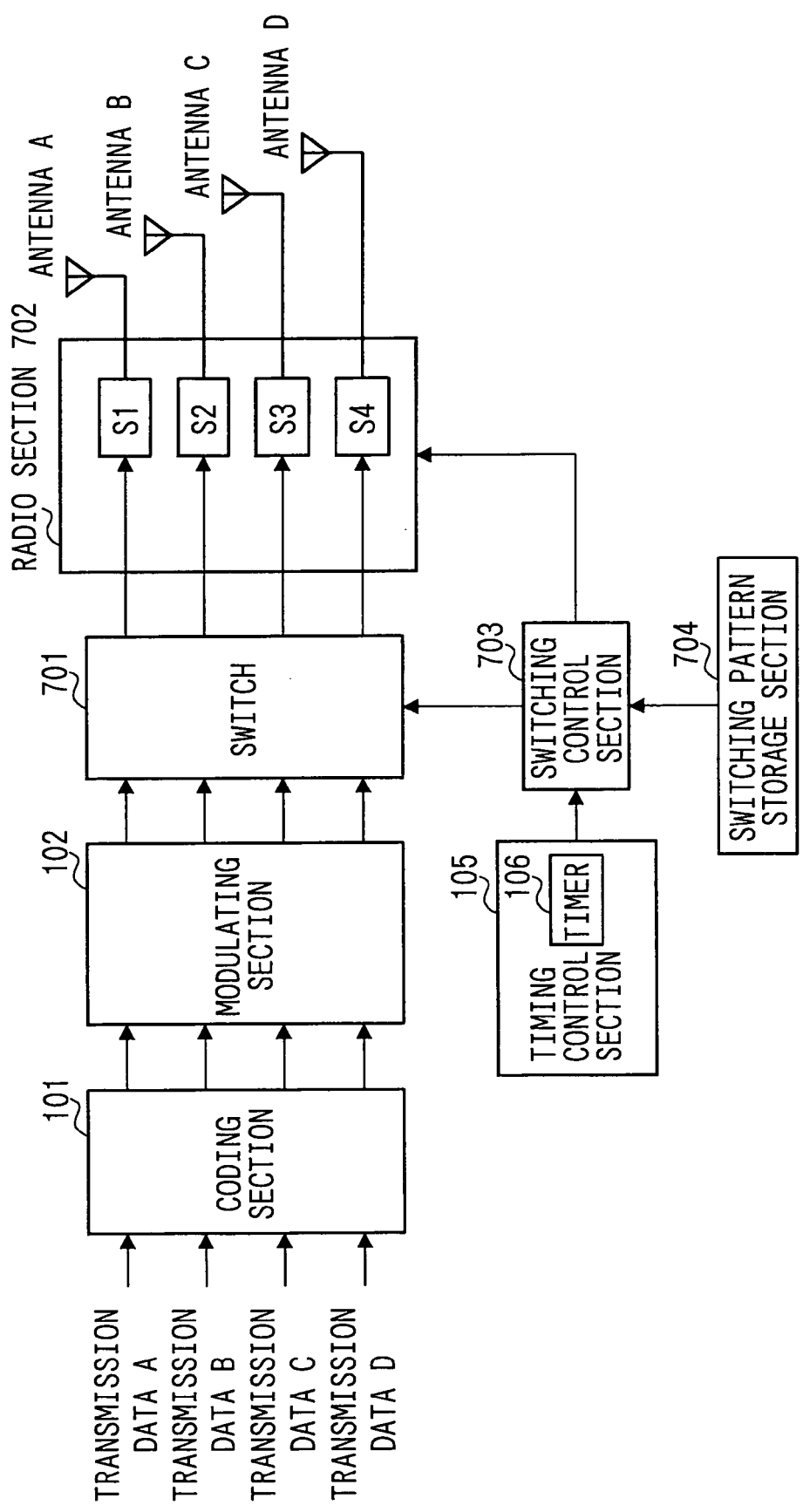
FIG. 8 is a general block diagram illustrating a schematic configuration of a radio communication apparatus according to a fourth embodiment of the present invention.

The radio communication apparatus and antenna control method according to the fourth embodiment of the present invention will be explained below with reference to FIGS. 8 to 11. FIG. 8 is a general block diagram illustrating a schematic configuration of the radio communication apparatus according to the fourth embodiment of the present invention. In addition, the same sections as those in the first embodiment are assigned the same reference numerals and the detailed explanation is omitted.

In the radio communication apparatus illustrated in FIG. 8, switch 701 switches between synthesizers S1 to S4 in radio section 702 to connect to modulating section 102.

Switching control section 703 controls the switching of switch 701 according to switching patterns which are preset in switching pattern storage section 704 and which are each indicative of a connection relationship between transmission data A to D and each of synthesizers S1 to S4.

The radio communication apparatus according to this embodiment is comprised of four synthesizers S1 to S4 and four antennas A to D, so that the radio communication apparatus according to this embodiment transmits transmission data A to D respectively to four communication stations A to D (i.e., transmission data A to communication station A and the like). That is, in this embodiment, the radio communication apparatus is assumed to be used in a one-to-four communication system where one radio communication apparatus transmits respective different transmission data to four communication stations using four antennas.

Figure 11:
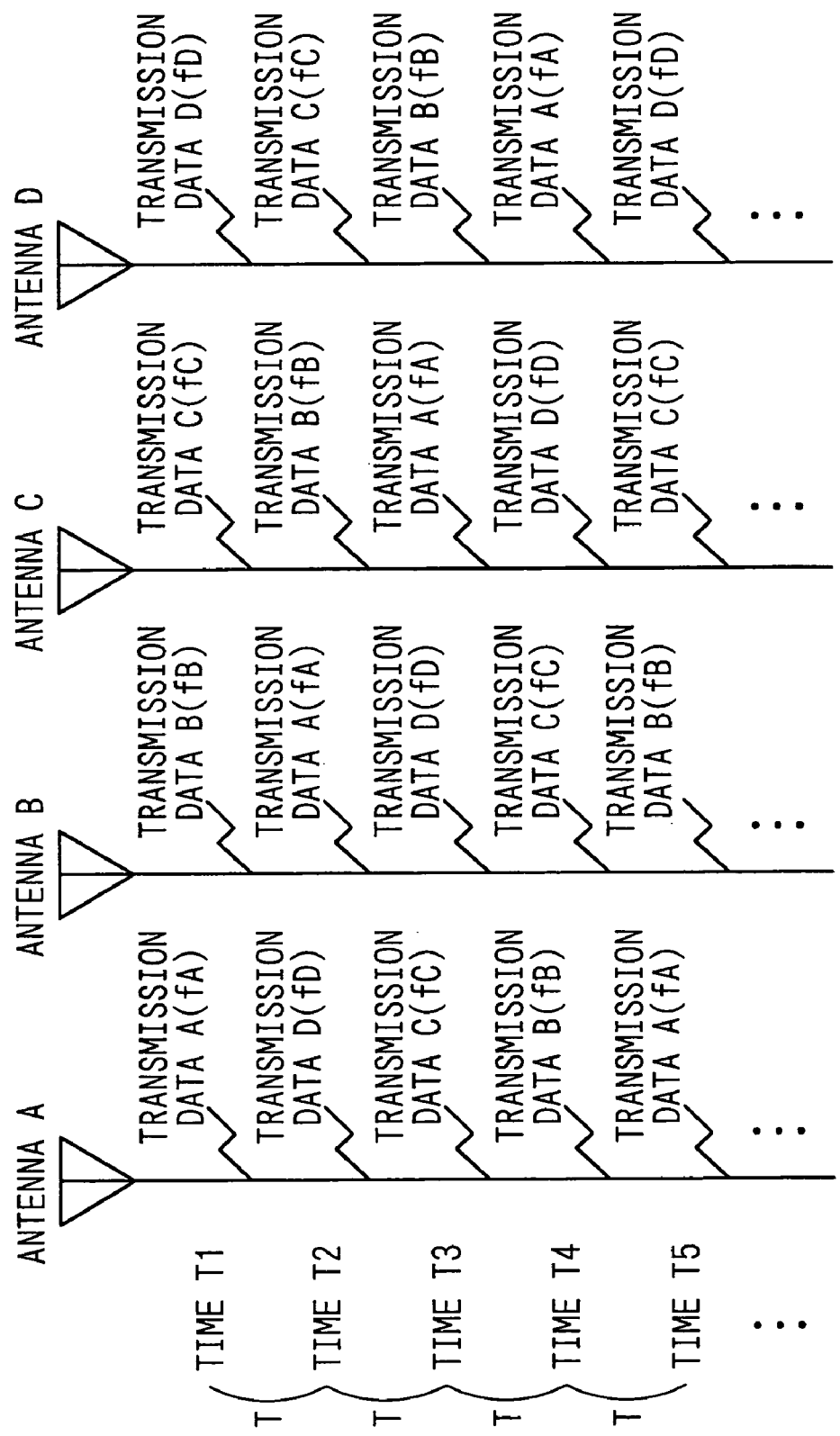
FIG. 11 is a diagram illustrating a situation where data is transmitted from each antenna of the radio communication apparatus according to the fourth embodiment of the present invention.

The operation of the radio communication apparatus with the above configuration will be explained next. FIG. 9 is a diagram illustrating an example of the switching patterns preset in the switching pattern storage section in the radio communication apparatus according to the fourth embodiment of the present invention. FIG. 10 is a diagram illustrating timings at which each synthesizer switches carrier frequencies in the radio communication apparatus according to the fourth embodiment of the present invention. FIG. 11 is a diagram illustrating a situation where data is transmitted from each antenna of the radio communication apparatus according to the fourth embodiment of the present invention.

The transmission data A to D subjected to the predetermined modulation processing in modulating section 102 are output in the baseband state to switch 701. Accordingly, each of the transmission data A to D is assigned to a respective antenna A, B, C or D in the baseband state before being subjected to the frequency conversion.

According to the timing control signal output from timing control section 105, switching control section 703 refers to switching pattern storage section 704, and controls the switching of switch 701. Specifically, switching pattern storage section 704 are preset for the switching pattern as illustrated in FIG. 9. Whenever the timing control signal is output, switching control section 703 refers to one of patterns 1 to 4 sequentially. That is, at time T1, switching control section 703 refers to the pattern 1 and according to this pattern, switches switch 701. Similarly, switching control section 703 refers to the pattern 2, pattern 3, and pattern 4 respectively at time T2, time T3 and time T4, and according to each pattern, switches switch 701. Further, at time T5, switching control section 703 refers to the pattern 1 again, and continues the similar processing as described above thereafter.

According to such an operation, at time T1, the transmission data A, transmission data B, transmission data C and transmission data D are input at the same time respectively to synthesizers S1, S2, S3 and S4. Further, at time T2, the transmission data D, transmission data A, transmission data B, and the transmission data C are input at the same time respectively to synthesizers S1, S2, S3 and S4. Thereafter in the similar way, transmission data to be input to each synthesizer is switched sequentially.

Further, according to the timing control signal output from timing control section 105, switching control section 703 controls the switching of carrier frequencies of synthesizers S1 to S4. Specifically, according to timings as illustrated in FIG. 10, the switching of the carrier frequencies is controlled.

That is, at time T1, synthesizers S1, S2, S3 and S4 perform frequency conversion on input transmission data respectively with the carrier frequency fA, carrier frequency fB, carrier frequency fC, and the carrier frequency fD. At time T2, synthesizers S1, S2, S3 and S4 perform frequency conversion on input transmission data respectively with the carrier frequency fD, carrier frequency fA, carrier frequency fB, and the carrier frequency fC. At time T3 and thereafter, the similar processing is repeated.

By such an operation, as in the first embodiment, transmission data A to D with the respective carrier frequencies fA to fD are switched sequentially between antennas A to D to be transmitted therefrom. Specifically, as illustrated in FIG. 11, as in the first embodiment, at each time Tn, transmission data A to D with the respective carrier frequencies fA to fD are switched sequentially between antennas A to D to be transmitted therefrom.

Thus, according to the radio communication apparatus and antenna control method according to this embodiment, a plurality of kinds of transmission data in digital baseband state is assigned to each antenna sequentially before being converted to a signal with the carrier frequency of a high frequency. Therefore, as compared to the case that the transmission data is converted to a signal with the carrier frequency and that the resultant signal is assigned to each antenna, it is possible to decrease losses of, for example, power of transmission data occurring due to the switching operation.

Fifth Embodiment

A radio communication apparatus and antenna control method according to this embodiment are different from those of the fourth embodiment in a point that a plurality of synthesizers is provided for an antenna so as to switch a carrier frequency of a synthesizer while another synthesizer performs the frequency conversion.

In the radio communication apparatus according to the above-mentioned fourth embodiment, each of antennas A to D is assigned one of synthesizers S1 to S4, and one synthesizer corresponding to each antenna switches between carrier frequencies fA to fD sequentially.

However, the synthesizer is an analog device, and it takes a time to some extent for the synthesizer to switch the carrier frequency. In other words, when the synthesizer switches the carrier frequency from fA to fB, it takes a time to some extent until the carrier frequency converges to the carrier frequency fB that is a goal frequency after being switched. Unless the carrier frequency is stable, it is not possible for a radio communication apparatus to perform stable data transmission.

Then, in this embodiment, a plurality of synthesizers are provided for each antenna, so that a synthesizer switches the carrier frequency while another synthesizer performs the frequency conversion on the transmission data. It is thereby possible for the synthesizer that is not performing the frequency conversion on the transmission data currently to switch the carrier frequency with a sufficient time given. Accordingly, such a synthesizer is able to perform the frequency conversion with the stable carrier frequency in performing the frequency conversion on the transmission data next time.

Figure 12:
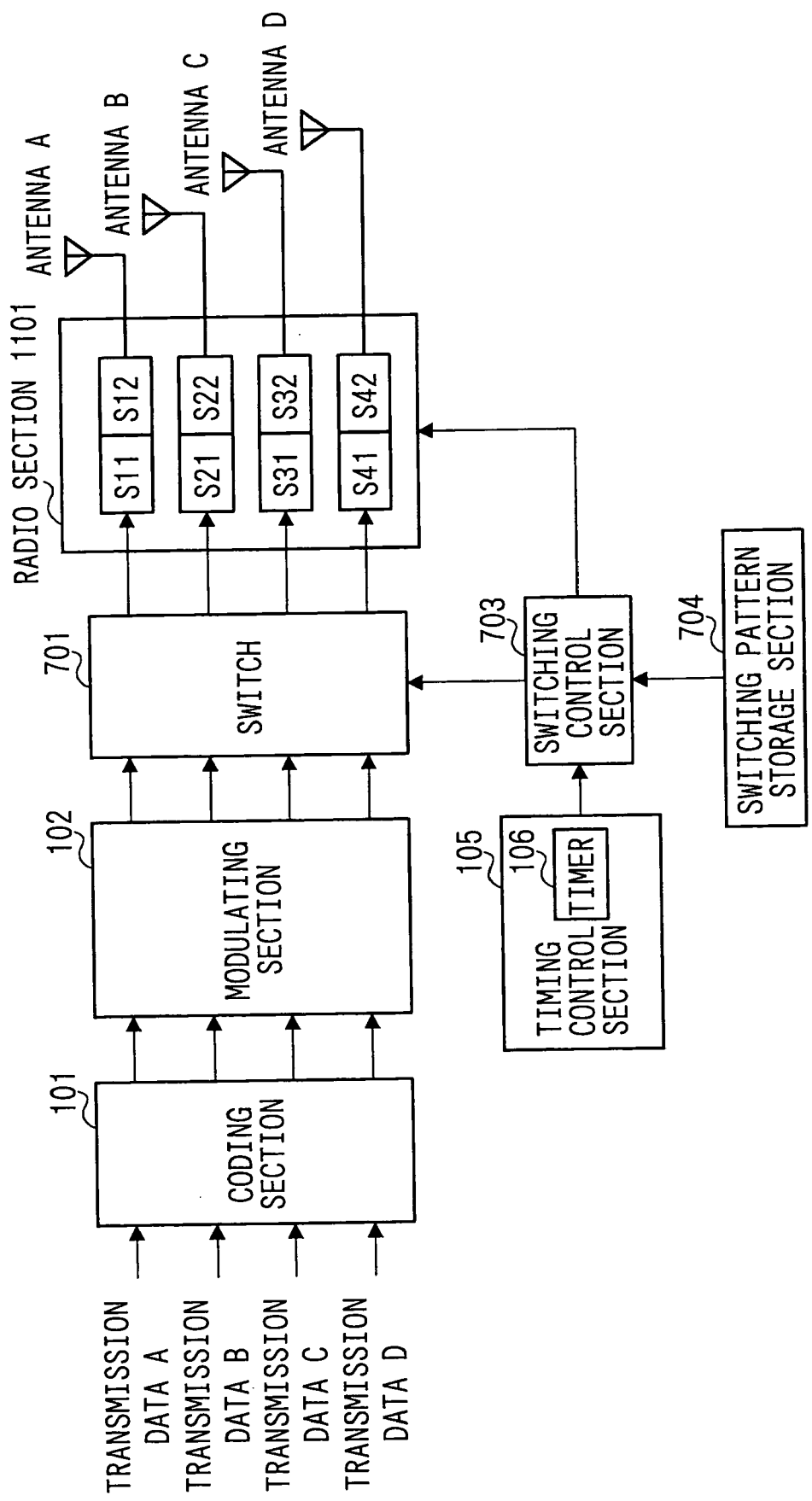
FIG. 12 is a general block diagram illustrating a schematic configuration of a radio communication apparatus according to a fifth embodiment of the present invention.
Figure 14:
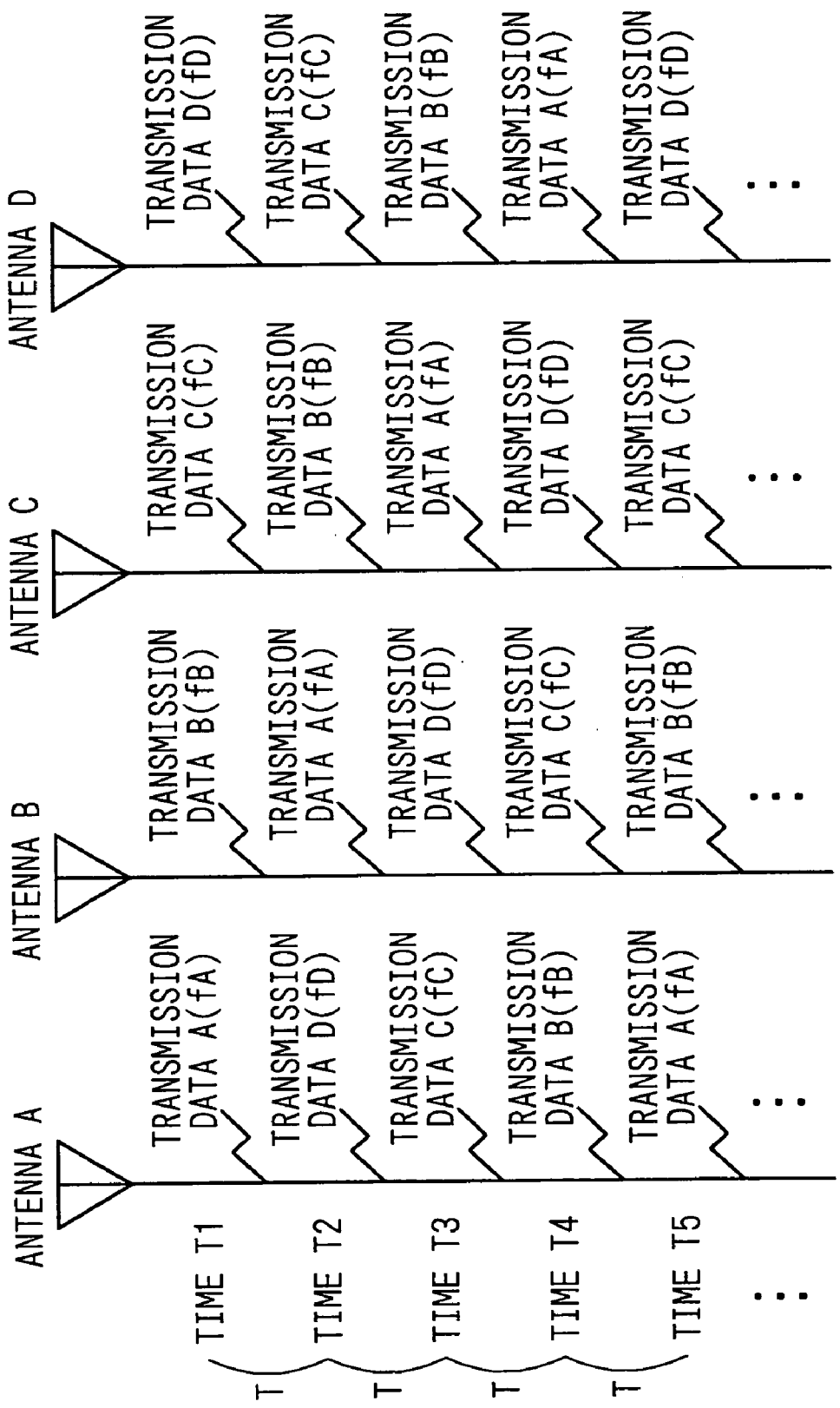
FIG. 14 is a diagram illustrating a situation where data is transmitted from each antenna of the radio communication apparatus according to the fifth embodiment of the present invention.

The radio communication apparatus and antenna control method according to the fifth embodiment of the present invention will be explained below with reference to FIGS. 12 to 14. FIG. 12 is a general block diagram illustrating a schematic configuration of the radio communication apparatus according to the fifth embodiment of the present invention. In addition, the same sections as those in the fourth embodiment are assigned the same reference numerals and the detailed explanation is omitted.

In the radio communication apparatus illustrated in FIG. 12, radio section 1101 is provided with S11 and S12 for the antenna A, with S21 and S22 for the antenna B, with S31 and S32 for the antenna C, and with S41 and S42 for the antenna D. In other words, a plurality of synthesizers is provided for a single antenna. In addition, this embodiment provides two synthesizers for a single antenna, however, the number of synthesizers is not limited to two, and it is only necessary that the number of synthesizers to be provided for a single antenna is plural.

The operation of the radio communication apparatus with the above configuration will be explained next. FIG. 13 is a diagram illustrating timings at which each synthesizer switches carrier frequencies in the radio communication apparatus according to the fifth embodiment of the present invention. FIG. 14 is a diagram illustrating a situation where data is transmitted from each antenna of the radio communication apparatus according to the fifth embodiment of the present invention.

According to the timing control signal output from timing control section 105, switching control section 703 controls the switching of carrier frequencies for S11 to S42. Specifically, at timings as illustrated in FIG. 13, the section 703 controls the switching of carrier frequencies. In addition, the frequency switching operation on synthesizers S11 and S12 for the antenna A is the same as frequency switching operation on synthesizers S21 to S42 for the antenna B to D, and therefore, the frequency switching operation on synthesizers S11 and S12 for the antenna A will be only explained below.

At time T1, synthesizer S11 performs the frequency conversion on transmission data A with the carrier frequency fA. While synthesizer S11 is performing the frequency conversion on the transmission data A, synthesizer S12 switches the carrier frequency to fD.

Next at time T2, synthesizer S12 performs the frequency conversion on transmission data D with the carrier frequency fD. Synthesizer S12 was able to switch the carrier frequency to fD at time T1 in a sufficient time, whereby at time T2, the carrier frequency of synthesizer S12 has already converged to fD and is stable. While synthesizer S12 is performing the frequency conversion, synthesizer S11 switches the carrier frequency from fA to fC. At time T3 and thereafter, the similar operation is repeated.

By such an operation, as in the first and fourth embodiments, transmission data A to D with the respective carrier frequencies fA to fD are switched sequentially between antennas A to D to be transmitted therefrom. Specifically, as illustrated in FIG. 14, as in the first and fourth embodiments, at each time Tn, transmission data A to D with the respective carrier frequencies fA to fD are switched sequentially between antennas A to D to be transmitted therefrom.

Thus, according to the radio communication apparatus and antenna control method according to this embodiment, a plurality of synthesizers is provided for a single antenna, and a synthesizer switches the carrier frequency while another synthesizer performs the frequency conversion on the transmission data, whereby it is possible for the synthesizer that is not performing the frequency conversion on the transmission data currently to switch the carrier frequency with a sufficient time given. Accordingly, such a synthesizer is able to perform the frequency conversion with the stable carrier frequency in performing the frequency conversion on the transmission data next time. Accordingly, the radio communication apparatus is able to perform stable data transmission.

In addition in the above-mentioned first to fifth embodiments, to simplify the explanation, it is assumed that the number of kinds of transmission data and the number of antennas are 4, however, the number of kinds of transmission data and the number of antennas are not limited to 4.

Further, in the above-mentioned first to fifth embodiments, to simplify the explanation, the number of antennas (antennas A to D, i.e., "4") is made equal to the number of kinds of transmission data (transmission data A to D, i.e., "4"), however, it is not necessary that the number of antennas is equal to the number of kinds of transmission data. It addition, it is required that the number of antennas is one of the multiples or divisors of the number of kinds of transmission data.

In the case where the number of antennas is one of the multiples of the number of kinds of transmission data, a kind of transmission data (for example, transmission data A) may be transmitted from a plurality of antennas (for example, antennas A and B) at the same time. Since the power of the transmission data is increased by thus performing, it is possible to improve the error correcting capability.

Further in this case, instead of assigning the same number of antennas to each transmission data, it may be possible to change as appropriate the number of antennas to assign corresponding to the priority (or importance) of the transmission data. In other words, it may be possible to increase the number of antennas to assign as the priority of the transmission data increases.

Specifically, for example, when the number of antennas is "8" and the number of kinds of transmission data is "4", it may be possible to assign five antennas to a kind of transmission data with a high priority, while assigning an antenna to each of other kinds of transmission data. The power of the transmission data with the high priority is thereby increased, whereby it is possible to further improve the error correcting capability on the transmission data with the high priority.

Moreover, in the case where the number of antennas is one of the divisors of the number of kinds of transmission data, a plurality of kinds of transmission data (for example, transmission data A and transmission data B) may be multiplexed and transmitted from an antenna (for example, antenna A) at the same time. It is thereby possible to decrease the number of transmission antennas, and therefore to reduce the scale of the apparatus.

Further, switching patterns explained above are examples, are not limited to those, and are capable of being modified as appropriate. Furthermore, in the above explanation, while switching intervals are set to constant time T, the switching intervals are not limited to that, and need not to be equal intervals.

Moreover, the present invention is not limited to the above-mentioned first to fifth embodiments, and is capable of being carried into practice with various modifications thereof. Further, in the present invention, the above-mentioned first to fifth embodiments are capable of being carried into practice in a combination thereof as appropriate.

As explained above, according to the present invention, excellent diversity effects can be obtained even when the number of antennas is 1 on the receiving side in a one-to-N communication system where a transmitting-side apparatus provided with a plurality of antennas transmits respective different information to a plurality of (N) receiving-side apparatuses using the antennas.

This application is based on the Japanese Patent Applications No. HEI11-263599 filed on Sep. 17, 1999 and No. HEI11-339411 filed on Nov. 30, 1999, entire contents of which are expressly incorporated by reference herein.

INDUSTRIAL APPLICABILITY

The present invention is applicable to a communication terminal apparatus and base station apparatus used in a one-to-N communication system where a transmitting-side apparatus provided with a plurality of antennas transmits respective different information to a plurality of (N) receiving-side apparatuses using the antennas, such as a radio communication service system.

What is claimed is:

1. A base station apparatus comprising:
   a plurality of antennas that transmit a plurality of differing transmission data to a plurality of mobile station apparatuses;
   a storage section that stores a switching pattern, said switching pattern being stored in said storage section in advance and comprising the same number of patterns as the plurality of transmission data defining relationships between the plurality of antennas and the plurality of transmission data at predetermined times; and
   a switching section that uses said same number of patterns as the plurality of transmission data in repetition and switches around the plurality of transmission data between the plurality of antennas; wherein
   said switching section makes a repeating period of said same number of patterns as the plurality of transmission data equal to a time interleaving length in the transmission data.

2. The base station apparatus according to claim 1, wherein said storage section stores the switching pattern for performing the switching operation between antennas having low correlation with each other.

3. The base station apparatus according to claim 1, further comprising:
   a converter that converts frequencies of the plurality of transmission data to respective frequencies different from each other, thereby performing frequency conversion,
   wherein said switching section performs the switching operation on the plurality of transmission data subjected to the frequency conversion in said converter.

4. The base station apparatus according to claim 1, further comprising:
   a converter that converts frequencies of the plurality of transmission data to respective frequencies different from each other, thereby performing frequency conversion,
   wherein said switching section performs the switching operation on the plurality of transmission data to be subjected to the frequency conversion in said converter.

5. The base station apparatus according to claim 1, further comprising:
   a converter that converts frequencies of the plurality of transmission data to respective frequencies different from each other, thereby performing frequency conversion,
   wherein said converter has a plurality of synthesizers for each antenna, and performs the frequency conversion on transmission data by one synthesizer while switching a conversion frequency of another synthesizer.

6. An antenna control method employing a plurality of antennas that transmit a plurality of differing transmission data, said method comprising:
   using the same number of patterns as the plurality of transmission data defining relationships between the plurality of antennas and the plurality of transmission data at predetermined times in repetition and switching around the plurality of transmission data between the plurality of antennas; and
   transmitting the plurality of transmission data from each of the plurality of antennas to a plurality of mobile station apparatuses, wherein
   a repeating period of said same number of patterns as the plurality of transmission data is made equal to a time interleaving length in the transmission data.

* * * * *